United States Patent
Lomayev et al.

(10) Patent No.: US 10,153,935 B2
(45) Date of Patent: Dec. 11, 2018

(54) APPARATUS, SYSTEM AND METHOD OF COMMUNICATING A TRANSMISSION ACCORDING TO A ROTATED 256 QUADRATURE AMPLITUDE MODULATION (QAM) SCHEME

(71) Applicant: INTEL CORPORATION, Santa Clara, CA (US)

(72) Inventors: Artyom Lomayev, Nizhny Novgorod (RU); Alexander Kostin, Nizhny Novgorod (RU); Iaroslav P. Gagiev, Nizhny Novgorod (RU); Alexander Maltsev, Nizhny Novgorod (RU); Michael Genossar, Modiin (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/391,270

(22) Filed: Dec. 27, 2016

(65) Prior Publication Data
US 2018/0019906 A1    Jan. 18, 2018

Related U.S. Application Data

(60) Provisional application No. 62/363,412, filed on Jul. 18, 2016.

(51) Int. Cl.
*H04L 27/00* (2006.01)
*H04L 27/36* (2006.01)

(52) U.S. Cl.
CPC ................ *H04L 27/361* (2013.01)

(58) Field of Classification Search
CPC ........... H04W 72/0446; H04L 41/0896; H04L 27/2646; H04L 27/261; H04L 1/0083;
(Continued)

(56) References Cited

U.S. PATENT DOCUMENTS 5,063,574 A * 11/1991 Moose ................ H04L 27/2602
375/244
5,524,025 A * 6/1996 Lawrence ........... H04L 27/3427
348/472

(Continued)

FOREIGN PATENT DOCUMENTS

WO       2010042655       4/2010
WO    WO 2010042655 A1 *  4/2010    .......... H04J 13/0014
(Continued)

OTHER PUBLICATIONS

CID 8020, 8025, 8026 resolution text 64-QAM non-uniform constellation for SC DMG, doc.: IEEE 802.11-16/0840r0 submitted by Thomas Handte ("Handte"), Jul. 2016.*
(Continued)

*Primary Examiner* — Berhanu Tadese
(74) *Attorney, Agent, or Firm* — Shichrur & Co.

(57) ABSTRACT

Some demonstrative embodiments include apparatus, system and method of communicating a transmission according to a rotated 256 Quadrature Amplitude Modulation (QAM) scheme. For example, an apparatus may include logic and circuitry configured to cause a wireless station to modulate a Single Carrier (SC) transmission according to a rotated 256-QAM scheme; and to transmit the SC transmission over a millimeter Wave (mmWave) frequency band.

20 Claims, 5 Drawing Sheets

(58) Field of Classification Search
CPC .. H04L 1/0084; H04L 27/2602; H04L 1/0079
See application file for complete search history.

(56) References Cited

U.S. PATENT DOCUMENTS

| | | | | |
|---|---|---|---|---|
| 7,688,902 | B1* | 3/2010 | Lou | H04L 1/0054 375/260 |
| 8,457,256 | B2* | 6/2013 | Gamage | H04L 25/067 375/219 |
| 8,621,539 | B1* | 12/2013 | Monk | H04L 12/2801 725/111 |
| 9,008,167 | B2* | 4/2015 | Azizi | H04L 27/2647 370/206 |
| 9,231,809 | B2* | 1/2016 | Azizi | H04L 27/2647 |
| 9,313,075 | B2* | 4/2016 | Azizi | H04L 27/2666 |
| 9,461,590 | B2* | 10/2016 | Langer | H03F 1/0205 |
| 9,461,855 | B2* | 10/2016 | Kenney | H04L 27/22 |
| 9,479,233 | B2* | 10/2016 | Maltsev | H04B 7/0669 |
| 2004/0042565 | A1* | 3/2004 | Garrett | H04L 1/0054 375/341 |
| 2006/0085727 | A1* | 4/2006 | Azenkot | H04L 5/02 714/792 |
| 2010/0290561 | A1* | 11/2010 | Ko | H04L 1/0041 375/298 |
| 2011/0150503 | A1* | 6/2011 | Winzer | H04B 10/60 398/202 |
| 2013/0194506 | A1* | 8/2013 | Eyvazkhani | H03M 13/25 348/649 |
| 2013/0216221 | A1* | 8/2013 | Zhang | H04L 1/0057 398/43 |
| 2013/0291046 | A1* | 10/2013 | Ko | H04N 21/84 725/116 |
| 2013/0343489 | A1* | 12/2013 | Maiberger | H04L 27/06 375/320 |
| 2014/0270012 | A1* | 9/2014 | Sagi | H04L 27/38 375/341 |
| 2015/0156777 | A1* | 6/2015 | Negus | H04J 1/00 455/451 |
| 2015/0256376 | A1* | 9/2015 | Limberg | H04L 27/2646 375/261 |
| 2016/0164800 | A1* | 6/2016 | Eitan | H04L 47/80 370/389 |
| 2016/0249332 | A1* | 8/2016 | Xin | H04L 27/3455 |
| 2016/0255660 | A1* | 9/2016 | Son | H04B 7/0491 370/329 |
| 2016/0309457 | A1* | 10/2016 | Eitan | H04L 1/0079 |
| 2016/0330059 | A1* | 11/2016 | Eitan | H03M 13/1505 |
| 2016/0330738 | A1* | 11/2016 | Eitan | H04W 72/0446 |
| 2017/0019281 | A1* | 1/2017 | Zhang | H04L 1/0057 |
| 2017/0033958 | A1* | 2/2017 | Eitan | H04L 25/0202 |
| 2017/0070995 | A1* | 3/2017 | Eitan | H04W 72/0453 |
| 2017/0111139 | A1* | 4/2017 | Greenberg | H04L 1/0009 |
| 2017/0127386 | A1* | 5/2017 | Kasher | H04B 7/0413 |
| 2017/0134126 | A1* | 5/2017 | Sanderovich | H04L 5/0044 |
| 2017/0195141 | A1* | 7/2017 | Sanderovich | H04L 25/03006 |
| 2017/0195142 | A1* | 7/2017 | Sanderovich | H04L 5/055 |
| 2017/0201992 | A1* | 7/2017 | Cordeiro | H04W 40/244 |
| 2017/0207833 | A1* | 7/2017 | Cordeiro | H04B 7/0452 |
| 2017/0207905 | A1* | 7/2017 | Eitan | H04L 1/008 |
| 2017/0223571 | A1* | 8/2017 | Ghosh | H04W 72/0446 |
| 2018/0019906 | A1* | 1/2018 | Lomayev | H04L 27/361 |
| 2018/0026749 | A1* | 1/2018 | Lomayev | H04L 1/0643 375/267 |

FOREIGN PATENT DOCUMENTS

| | | | | |
|---|---|---|---|---|
| WO | 2015178725 | | 11/2015 | |
| WO | WO 2015178725 | A1 * | 11/2015 | H04L 27/34 |

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ac™-2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™-2012. IEEE Standard for Information technology—Telecommunications and information exchange between systems Local and metropolitan area networks™Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

International Search Report and Written Opinion for PCT/US2017/038054, dated Sep. 21, 2017, 13 pages.

* cited by examiner

APPARATUS, SYSTEM AND METHOD OF COMMUNICATING A TRANSMISSION ACCORDING TO A ROTATED 256 QUADRATURE AMPLITUDE MODULATION (QAM) SCHEME

CROSS REFERENCE

This Application claims the benefit of and priority from U.S. Provisional Patent Application No. 62/363,412 entitled "APPARATUS, SYSTEM AND METHOD OF COMMUNICATING A TRANSMISSION ACCORDING TO A ROTATED 256 QAM SCHEME", filed Jul. 18, 2016, the entire disclosure of which is incorporated herein by reference.

TECHNICAL FIELD

Embodiments described herein generally relate to communicating a transmission according to a rotated 256 Quadrature Amplitude Modulation (QAM) scheme.

BACKGROUND

A wireless communication network in a millimeter-wave band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
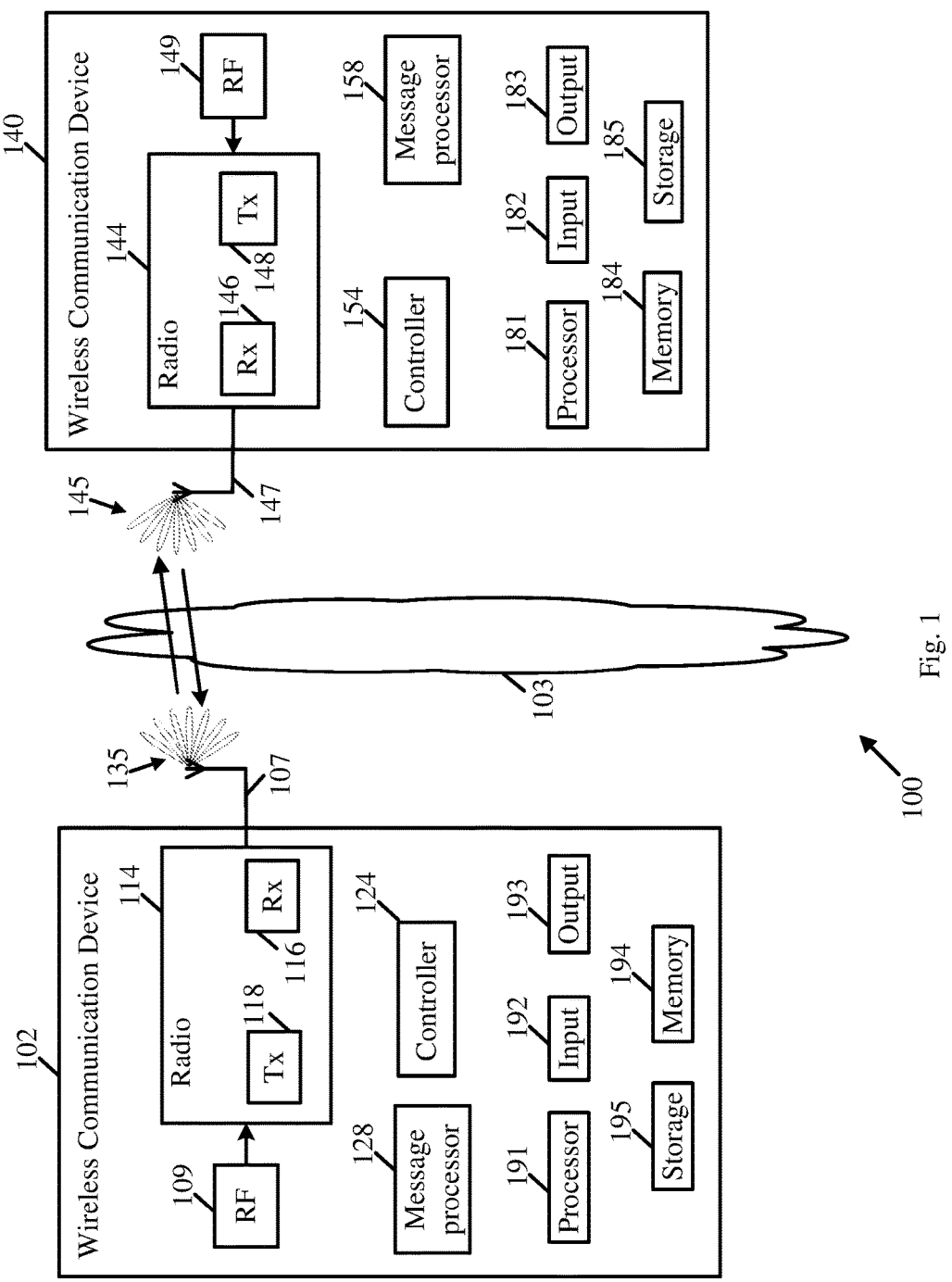
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac*-2013 (*"IEEE P802.11ac-*2013*, IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6 GHz", December,* 2013); *IEEE* 802.11*ad* (*"IEEE P802.11ad-*2012*, IEEE Standard for Information Technol-* ogy—*Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the 60 GHz Band"*, 28 December, 2012); IEEE-802.11REVmc (*"IEEE 802.11-REVmc™/D3.0, June* 2014 *draft standard for Information technology—Telecommunications and information exchange between systems Local and metropolitan area networks Specific requirements; Part* 11: *Wireless LAN Medium Access Control (MAC) and Physical Layer (PHY) Specification*"); IEEE802.11-ay (*P802.11 ay Standard for Information Technology—Telecommunications and Information Exchange Between Systems Local and Metropolitan Area Networks— Specific Requirements Part* 11: *Wireless LAN Medium Access Control (MAC) and Physical Layer (PHY) Specifications—Amendment: Enhanced Throughput for Operation in License-Exempt Bands Above* 45 *GHz*)) and/or future versions and/or derivatives thereof, devices and/or networks operating in accordance with existing WiFi Alliance (WFA) Peer-to-Peer (P2P) specifications (including *WiFi P2P technical specification, version* 1.5, Aug. 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a frequency band above 45 GHZ, a frequency band below 20 GHZ, e.g., a Sub 1 GHZ (S1G) band, a 2.4 GHz band, a 5 GHZ band, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "mmWave STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include one or more directional bands and/or channels. For example, WM 103 may include one or more millimeter-wave (mmWave) wireless communication bands and/or channels.

In some demonstrative embodiments, WM 103 may include one or more DMG channels. In other embodiments WM 103 may include any other directional channels.

In other embodiments, WM 103 may include any other type of channel over any other frequency band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radio 114 and/or radio 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, radios 114 and/or 144 may include, or may be associated with one or more, e.g., a plurality of, directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, device 140 may include one or more, e.g., a plurality of, RF chains 149 connected to, and/or associated with, antennas 147.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140 may include at least one STA.

In some demonstrative embodiments, device 102 and/or device 140 may include, operate as, perform the role of, and/or perform one or more functionalities of, one or more DMG STAs. For example, device 102 may include, operate as, perform the role of, and/or perform one or more functionalities of, at least one DMG STA, and/or device 140 may include, operate as, perform the role of, and/or perform one or more functionalities of, at least one DMG STA.

In other embodiments, devices 102 and/or 140 may include, operate as, perform the role of, and/or perform one or more functionalities of, any other wireless device and/or station, e.g., a WLAN STA, a WiFi STA, and the like.

In some demonstrative embodiments, device 102 and/or device 140 may be configured operate as, perform the role of, and/or perform one or more functionalities of, an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, device 102 and/or device 140 may be configured to operate as, perform the role of, and/or perform one or more functionalities of, a non-AP STA, e.g., a DMG non-AP STA, and/or a non-PCP STA, e.g., a DMG non-PCP STA, for example, a non-AP/PCP STA, e.g., a DMG non-AP/PCP STA.

In other embodiments, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multiple-Input-Multiple-Output (MIMO) communication, for example, for communicating over the NG60 and/or EDMG networks, e.g., over an NG60 or an EDMG frequency band.

In some demonstrative embodiments, devices 102 and/or 140 may be configured to operate in accordance with one or more Specifications, for example, including, one or more IEEE 802.11 Specifications, e.g., an IEEE 802.11ad Specification, an IEEE 802.11REVmc Specification, an IEEE 802.11ay Specification, and/or any other specification and/or protocol.

Some demonstrative embodiments may be implemented, for example, as part of a new standard in an mmWave band, e.g., a 60 GHz frequency band or any other directional band, for example, as an evolution of an IEEE 802.11ad Specification.

In some demonstrative embodiments, devices 102 and/or 140 may be configured according to one or more standards, for example, in accordance with an IEEE 802.11 ay Standard, which may be, for example, configured to enhance the efficiency and/or performance of an IEEE 802.11ad Specification, which may be configured to provide Wi-Fi connectivity in a 60 GHz band.

Some demonstrative embodiments may enable, for example, to significantly increase the data transmission rates defined in the IEEE 802.11ad specification, for example, from 7 Gigabit per second (Gbps), e.g., up to 30 Gbps, or to any other data rate, which may, for example, satisfy growing demand in network capacity for new coming applications.

Some demonstrative embodiments may be implemented, for example, to allow increasing a transmission data rate, for example, by applying MIMO and/or channel bonding techniques.

In some demonstrative embodiments, devices 102 and/or 140 may be configured to communicate MIMO communications over the mmWave wireless communication band.

In some demonstrative embodiments, device 102 and/or device 140 may be configured to support one or more mechanisms and/or features, for example, channel bonding, Single User (SU) MIMO, and/or Multi-User (MU) MIMO, for example, in accordance with an IEEE 802.11 ay Standard and/or any other standard and/or protocol.

In some demonstrative embodiments, device 102 and/or device 140 may include, operate as, perform a role of, and/or perform the functionality of, one or more EDMG STAs. For example, device 102 may include, operate as, perform a role of, and/or perform the functionality of, at least one EDMG STA, and/or device 140 may include, operate as, perform a role of, and/or perform the functionality of, at least one EDMG STA.

In some demonstrative embodiments, devices 102 and/or 140 may implement a communication scheme, which may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, SU MIMO techniques, and/or MU MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, device 102 and/or device 140 may be configured to implement one or more MU communication mechanisms. For example, devices 102 and/or 140 may be configured to implement one or more MU mechanisms, which may be configured to enable MU communication of DL frames using a MIMO scheme, for example, between a device, e.g., device 102, and a plurality of devices, e.g., including device 140 and/or one or more other devices.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

Some wireless communication Specifications, for example, the IEEE 802.11ad-2012 Specification, may be configured to support a SU system, in which a STA may transmit frames to a single STA at a time. Such Specifications may not be able, for example, to support a STA transmitting to multiple STAs simultaneously, for example, using a MU-MIMO scheme, e.g., a DL MU-MIMO, or any other MU scheme.

In some demonstrative embodiments, devices 102 and/or 140 may be configured to implement one or more mechanisms, which may, for example, enable to extend a single-channel BW scheme, e.g., a scheme in accordance with the IEEE 802.11ad Specification or any other scheme, for higher data rates and/or increased capabilities, e.g., as described below.

In some demonstrative embodiments, devices 102 and/or 140 may be configured to implement one or more channel bonding mechanisms, which may, for example, support communication over bonded channels.

In some demonstrative embodiments, the channel bonding mechanisms may include, for example, a mechanism and/or an operation whereby two or more channels can be combined, e.g., for a higher bandwidth of packet transmission, for example, to enable achieving higher data rates, e.g., when compared to transmissions over a single channel. Some demonstrative embodiments are described herein with respect to communication over a bonded channel, however other embodiments may be implemented with respect to communications over a channel, e.g., a "wide" channel, including or formed by two or more channels, for example, an aggregated channel including an aggregation of two or more channels.

In some demonstrative embodiments, device 102 and/or device 140 may be configured to implement one or more channel bonding mechanisms, which may, for example, support an increased channel bandwidth, for example, a channel BW of 4.32 GHz, a channel BW of 6.48 GHz, and/or any other additional or alternative channel BW.

In some demonstrative embodiments, devices 102 and/or 140 may be configured to implement, for example, one or more high order modulations schemes, for example, a 256 Quadrature Amplitude Modulation (QAM) scheme, for example, at least to support and/or allow increasing a transmission data rate, e.g., as described below.

In some demonstrative embodiments, a high order modulation scheme, e.g., a 256QAM scheme, may be implemented in addition to, or as an alternative to, one or more techniques, e.g., channel bonding and/or MIMO techniques.

In one example, the high order modulation scheme, e.g., 256QAM, may be implemented, for example, as an alternative to channel bonding, for example, in one or more countries, e.g., in China, where regulation rules allow using a restricted umber of channels, e.g., only 2 frequency channels or any other number of frequency channels. Such a restriction may introduce one or more problems for using channel bonding, for example, since even if using a channel bonding with a channel bonding factor of 2×, all channels will be occupied.

Some demonstrative embodiments are described herein with respect to a 256 QAM scheme. However, other embodiments may be implemented with respect to any order type and/or order of modulation scheme, e.g., QAM of any other order higher than or lower than 256.

In some demonstrative embodiments, devices 102 and/or 140 may be configured to generate, transmit, receive and/or process a transmission according to a rotated 256QAM scheme, for example, for Single Carrier (SC) physical layer (PHY), e.g., as described below. In other embodiments, the rotated 256QAM scheme may be implemented with any other PHY and/or transmission type and/or scheme.

In some demonstrative embodiments, the rotated 256QAM scheme may include, for example, a π/2-rotated 256QAM scheme for SC PHY, e.g., as described below. In other embodiments, the rotated 256QAM scheme may include an x-rotated 256QAM scheme, wherein x denotes any other rotation factor.

In some demonstrative embodiments, the π/2-rotated 256QAM scheme may be implemented, for example, for SC PHY, e.g., in a future IEEE 802.11 ay Standard.

In some demonstrative embodiments, the π/2-rotated 256QAM scheme may be, for example, defined as a Gray coded constellation, for example, configured to transform a plurality of bits, e.g., a group of 8 bits or any other number of bits, into a QAM symbol, and to multiply the QAM symbol by an exponent, e.g., an exponent $\exp(j\pi/2*k)$, wherein k denotes a time SC chip index, e.g., as described below.

In other embodiments, any other exponent or rotation factor may be used and/or any other rotation may be performed.

In some demonstrative embodiments, the π/2-rotated 256QAM scheme may be defined, for example, for SC PHY, e.g., to be implemented for communication over a directional frequency band, e.g., according to a future IEEE 802.11 ay Specification and/or any other specification and/or protocol.

In some demonstrative embodiments, introduction of the π/2-rotated 256QAM scheme, may allow, for example, the Gray coded 256QAM constellation to be implemented, for example, in a manner consistent with a SC PHY modulation definition. For example, the π/2 rotation may be applied in the SC PHY, for example, for SC data blocks as well as for Guard Intervals (GIs).

In some demonstrative embodiments, devices 102 and/or 140 may be configured to communicate a transmission according to a rotated 256QAM scheme, for example, according to the π/2-rotated 256QAM scheme, e.g., as described below.

In some demonstrative embodiments, controller 124 may be configured to control, cause and/or trigger device 102 to modulate a transmission, e.g., a SC transmission, according to a rotated 256QAM scheme, e.g., as described below.

In some demonstrative embodiments, the rotated 256-QAM scheme may include a π/2-rotated 256-QAM scheme.

In some demonstrative embodiments, controller 124 may be configured to control, cause and/or trigger device 102 to transmit the SC transmission over the mmWave frequency band.

In one example, transmitter 118 may be configured to transmit the SC transmission over the mmWave frequency band.

In some demonstrative embodiments, device 140 may receive, and/or process reception of, the SC transmission over the mmWave frequency band.

In some demonstrative embodiments, controller 154 may be configured to control, cause and/or trigger device 140 to receive the SC transmission over the mmWave frequency band.

In one example, receiver 146 may be configured to receive the SC transmission over the mmWave frequency band.

In some demonstrative embodiments, controller 154 may be configured to control, cause and/or trigger device 140 to demodulate the SC transmission according to the rotated 256QAM scheme, e.g., as described below.

In some demonstrative embodiments, device 102 may modulate and transmit the transmission, for example, according to the π/2-rotated 256-QAM scheme, e.g., as described below.

In some demonstrative embodiments, controller 124 may be configured to control, cause and/or trigger device 102 to modulate the SC transmission by mapping a multi-bit vector to a 256-QAM constellation point and rotating the 256-QAM constellation point by a rotation factor, e.g., as described below.

In some demonstrative embodiments, the multi-bit vector may include an 8-bit vector and/or the constellation scheme may include a 256QAM constellation scheme, e.g., as described below. In other embodiments, the multi-bit vector may include any other number of bits and/or the constellation scheme may include a constellation scheme of any other type and/or order, e.g., as described below In some demonstrative embodiments, controller 124 may be configured to control, cause and/or trigger device 102 to modulate the SC transmission by mapping an 8-bit vector to a 256-QAM constellation point and rotating the 256-QAM constellation point by a rotation factor, e.g., as described below. In one example, controller 124 may be configured to control, cause and/or trigger device 102 to encode data to be transmitted to device 140, for example, by encoding the data into a plurality of 8-bit blocks representing the data to be transmitted.

In some demonstrative embodiments, controller 124 may be configured to control, cause and/or trigger device 102 to modulate the SC transmission by rotating the 256-QAM constellation point in time, e.g., as described below.

In some demonstrative embodiments, the rotation factor may be based on $\pi/2$, e.g., as described below. In other embodiments, the rotation factor may be based on any other rotation value.

In some demonstrative embodiments, the rotation factor may be based on an integer multiple of $\pi/2$, e.g., as described below. In other embodiments, the rotation factor may be based on any other function of $\pi/2$.

In some demonstrative embodiments, the rotation factor may be based on a time index value corresponding to the 8-bit vector, which is to be mapped to the 256QAM constellation point, e.g., as described below.

In some demonstrative embodiments, the time index value may include a time SC chip index corresponding to the 8-bit vector.

In some demonstrative embodiments, the rotation factor may be based on a product of the time index value and $\pi/2$, e.g., as described below.

In other embodiments, the rotation factor may be based on any other additional or alternative function applied to the time index value, $\pi/2$, and/or any other parameter or value.

In some demonstrative embodiments, device 140 may receive and demodulate the transmission from device 102, for example, according to the $\pi/2$-rotated 256-QAM scheme, e.g., as described below.

In some demonstrative embodiments, controller 154 may be configured to control, cause and/or trigger device 140 to demodulate the SC transmission by de-rotating the rotated 256-QAM constellation point to a 256-QAM constellation point according to the rotation factor, and de-mapping the 256-QAM constellation point to an 8-bit vector, e.g., as described below.

In some demonstrative embodiments, controller 154 may be configured to control, cause and/or trigger device 140 to demodulate the SC transmission by de-rotating the 256-QAM constellation point in time, e.g., as described below.

Figure 2:
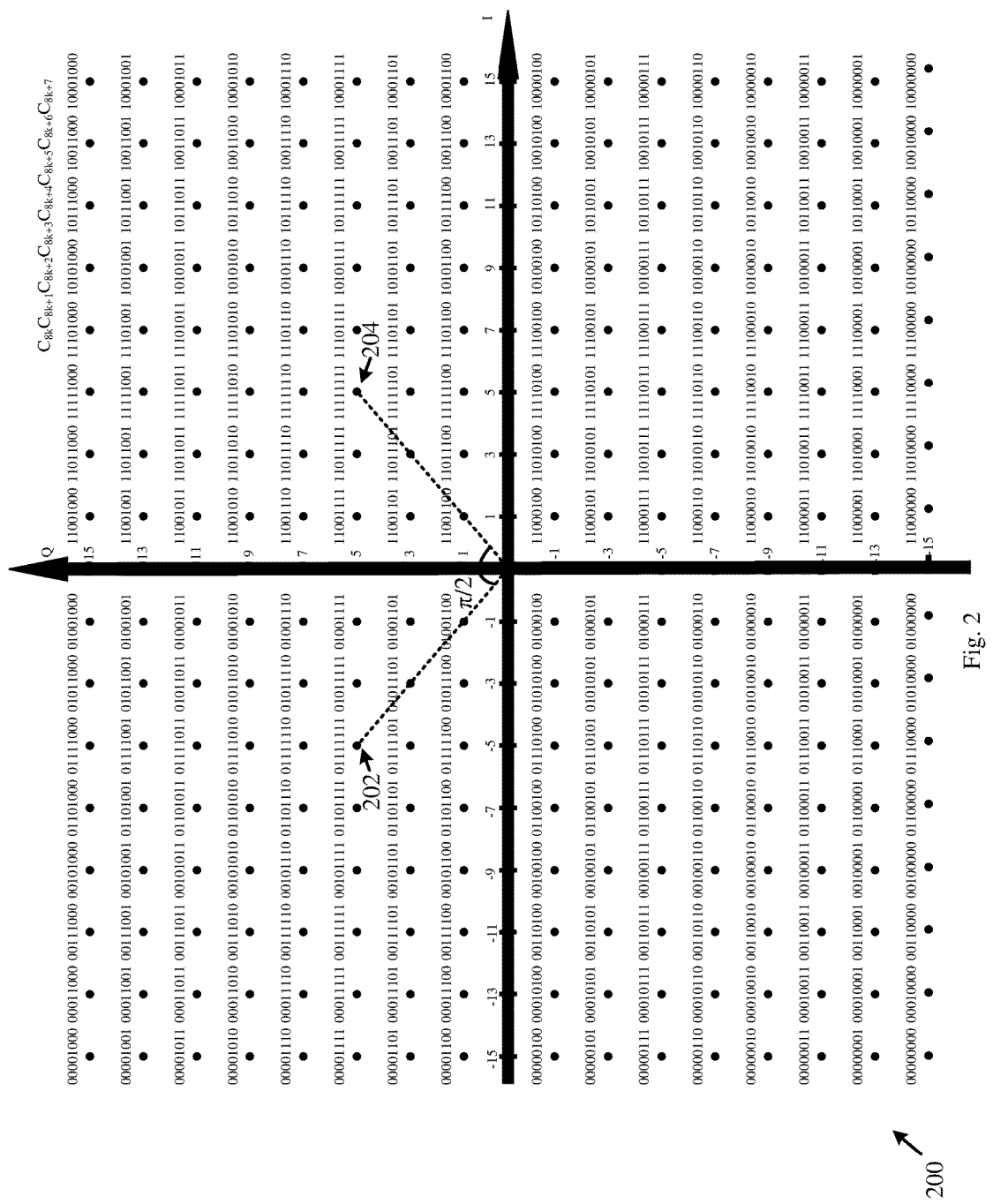
FIG. 2 is a schematic illustration of a 256 Quadrature Amplitude Modulation (QAM) constellation Gray bit coding scheme, in accordance with some demonstrative embodiments.

Reference is made to FIG. 2, which schematically illustrates a 256 QAM constellation Gray bit coding scheme 200, in accordance with some demonstrative embodiments.

In some demonstrative embodiments, device 102 (FIG. 1) may be configured to transform an input of an 8-bit vector into a 256QAM constellation point, for example, according to the $\pi/2$-rotated 256-QAM scheme, for example, based on the 256QAM constellation Gray bit coding scheme 200, e.g., as described below.

In some demonstrative embodiments, device 140 (FIG. 1) may be configured to de-transform a rotated 256QAM constellation point into an 8-bit vector, for example, according to the $\pi/2$-rotated 256-QAM scheme, for example, based on the 256 QAM constellation Gray bit coding scheme 200, e.g., as described below.

In one example, device 102 (FIG. 1) may process a k-th 8-bit vector, denoted $C_k$, wherein k denotes the time SC chip index of the 8-bit vector. For example, the vector $C_k$ may include the vector $C_k = \{C_{8k}, C_{8k+1}, C_{8k+2}, C_{8k+3}, C_{8k+4}, C_{8k+5}, C_{8k+6}, C_{8k+7}\}$.

In some demonstrative embodiments, controller 124 (FIG. 1) may cause device 102 (FIG. 1) to transform the 8-bit vector $C_k$ into a QAM constellation point, denoted $\tilde{s}_k$, for example, according to the 256 QAM constellation Gray bit coding scheme 200.

In some demonstrative embodiments, the QAM constellation point $\tilde{s}_k$ corresponding to vector $C_k$ the may be defined according to coding scheme 200, for example, as follows:

$$\tilde{s}_k = \frac{1}{\sqrt{170}} \quad (1)$$
$$(30 c_{8k} + 14 c_{8k+1} + 6 c_{8k+2} + 2 c_{8k+3} - 28 c_{8k} c_{8k+1} - 12 c_{8k} c_{8k+2} -$$
$$4 c_{8k} c_{8k+3} - 12 c_{8k+1} c_{8k+2} - 4 c_{8k+1} c_{8k+3} - 4 c_{8k+2} c_{8k+3} +$$
$$24 c_{8k} c_{8k+2} + 8 c_{8k} c_{8k+1} c_{8k+3} + 8 c_{8k} c_{8k+2} c_{8k+3} +$$
$$8 c_{8k+1} c_{8k+2} c_{8k+3} - 16 c_{8k} c_{8k+1} c_{8k+2} c_{8k+3} - 15) + +$$
$$\frac{j}{\sqrt{170}} (30 c_{8k+4} + 14 c_{8k+5} + 6 c_{8k+6} + 2 c_{8k+7} - 28 c_{8k+4} c_{8k+5} -$$
$$12 c_{8k+4} c_{8k+6} - 4 c_{8k+4} c_{8k+7} - 12 c_{8k+5} c_{8k+6} -$$
$$4 c_{8k+5} c_{8k+7} - 4 c_{8k+6} c_{8k+7} + 24 c_{8k+4} c_{8k+5} c_{8k+6} +$$
$$8 c_{8k+4} c_{8k+5} c_{8k+7} + + 8 c_{8k+4} c_{8k+6} c_{8k+7} +$$
$$8 c_{8k+5} c_{8k+6} c_{8k+7} - 16 c_{8k+4} c_{8k+5} c_{8k+6} c_{8k+7} - 15)$$

In some demonstrative embodiments, the mapping of the QAM constellation point $\tilde{s}_k$ according to coding scheme 200 may conform to, and/or comply with, for example, an encoding scheme of an *IEEE 802.11ac Specification*.

In some demonstrative embodiments, the QAM constellation points of the coding scheme 200 may be rotated in time, for example, by $\pi/2$ in time, e.g., according to a chip rate. This rotation may be, for example, in opposed to a modulation scheme of the IEEE 802.11ac Specification, which is defined for OFDM on a per subcarrier basis, and does not require any rotation.

In some demonstrative embodiments, a rotated 256QAM constellation point, denoted $S_k$, e.g., corresponding to the 8-bit vector $C_k$, may be defined, for example, by rotating a respective 256QAM constellation point $\tilde{s}_k$ of the coding scheme 200 corresponding to the vector $C_k$, e.g., as follows:

$$S_k = \tilde{s}_k \cdot \exp(j(\pi/2) \cdot k), k = 0, 1, \ldots \quad (2)$$

In some demonstrative embodiments, device 102 (FIG. 1) may be configured to modulate the SC transmission, for example, according to the coding scheme 200 with a constellation point rotation, e.g., according to Equation 2, and to transmit the SC transmission over the mmWave frequency band, e.g., the DMG band.

In some demonstrative embodiments, device 140 (FIG. 1), may be configured to receive the SC transmission over the mmWave frequency band, e.g., the DMG band, and to demodulate the SC transmission, according to the coding scheme 200 with the constellation point rotation, e.g., according to Equation 2.

In one example, device 102 (FIG. 1) may map an 8-bit vector "01111111" to a constellation point 202 of coding scheme 200, and the time SC chip index of the 8-bit vector may be k=1. According to this example, device 102 (FIG. 1) may rotate the constellation point 202 by $\pi/2=\pi/2*1$, to determine a resulting rotated constellation point 204 corresponding to an 8-bit vector "11111111".

In one example, device 140 (FIG. 1) may receive constellation point 204 of coding scheme 200 representing the 8-bit vector with the time SC chip index of k=1. According to this example, device 140 (FIG. 1) may de-rotate the constellation point 204 by $\pi/2=\pi/2*1$, to determine the resulting de-rotated constellation point 202, e.g., representing the 8-bit vector "01111111".

Figure 3:
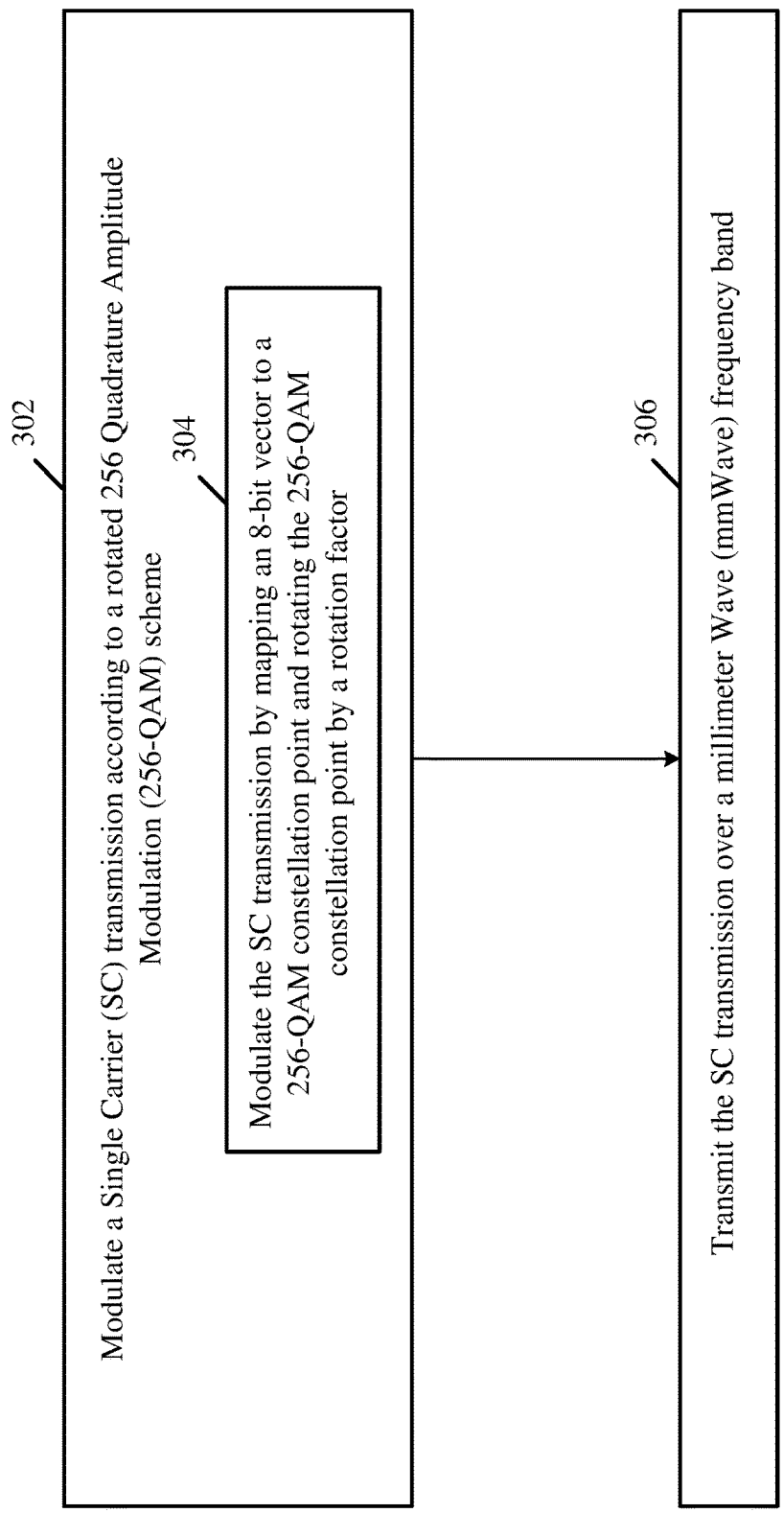
FIG. 3 is a schematic flow-chart illustration of a method of transmitting a transmission according to a rotated 256 QAM scheme, in accordance with some demonstrative embodiments.

Reference is made to FIG. 3, which schematically illustrates a method of transmitting a transmission according to a rotated 256QAM scheme, in accordance with some demonstrative embodiments. For example, one or more of the operations of the method of FIG. 3 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 302, the method may include modulating an SC transmission according to a rotated 256-QAM scheme. For example, controller 124 (FIG. 1) may control, cause and/or trigger device 102 (FIG. 1) to modulate the SC transmission according to the rotated 256-QAM scheme, e.g., as described above.

As indicated at block 304, modulating the SC transmission may include modulating the SC transmission by mapping an 8-bit vector to a 256-QAM constellation point and rotating the 256-QAM constellation point by a rotation factor. For example, controller 124 (FIG. 1) may control, cause and/or trigger device 102 (FIG. 1) to modulate the SC transmission by mapping the 8-bit vector to the 256-QAM constellation point and rotating the 256-QAM constellation point by the rotation factor, e.g., as described above.

As indicated at block 306, the method may include transmitting the SC transmission over an mmWave frequency band. For example, controller 124 (FIG. 1) may control, cause and/or trigger device 102 (FIG. 1) to transmit the SC transmission over the mmWave frequency band, e.g., as described above.

Figure 4:
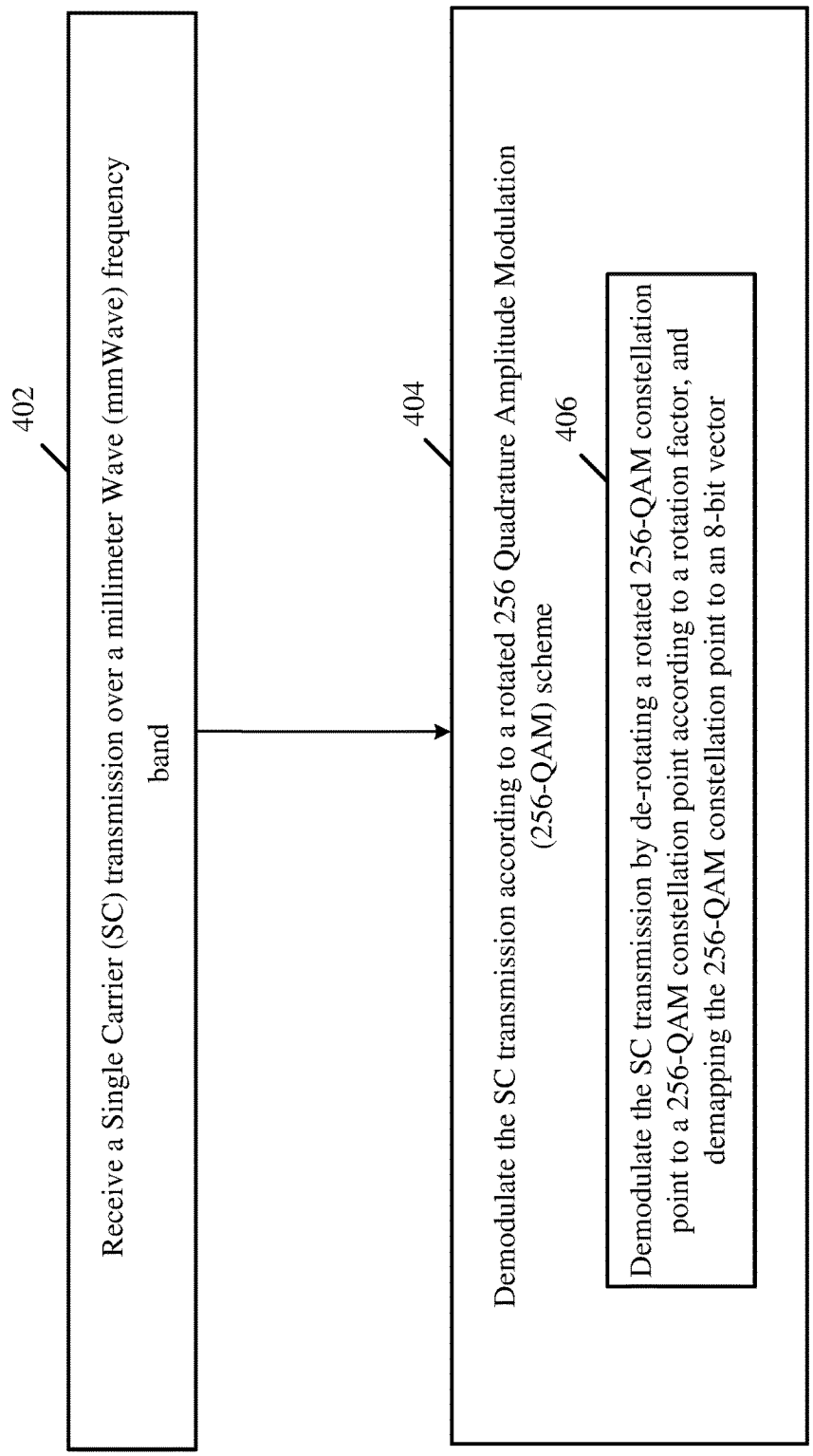
FIG. 4 is a schematic flow-chart illustration of a method of receiving a transmission according to a rotated 256 QAM scheme, in accordance with some demonstrative embodiments.

Reference is made to FIG. 4, which schematically illustrates a method of receiving a transmission according to a rotated 256 QAM scheme, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1); a controller, e.g., controller 124 (FIG. 1), and/or controller 154 (FIG. 1); a radio, e.g., radio 114 (FIG. 1), and/or radio 144 (FIG. 1); a transmitter, e.g., transmitter 118 (FIG. 1), and/or transmitter 148 (FIG. 1); a receiver e.g., receiver 116 (FIG. 1), and/or receiver 146 (FIG. 1); and/or a message processor, e.g., message processor 128 (FIG. 1), and/or message processor 158 (FIG. 1).

As indicated at block 402, the method may include receiving an SC transmission over an mmWave frequency band. For example, controller 154 (FIG. 1) may control, cause and/or trigger device 140 (FIG. 1) to receive the SC transmission over the mmWave frequency band, e.g., as described above.

As indicated at block 404, the method may include demodulating the SC transmission according to a rotated 256-QAM scheme. For example, controller 154 (FIG. 1) may control, cause and/or trigger device 140 (FIG. 1) to demodulate the SC transmission according to the rotated 256-QAM scheme, e.g., as described above.

As indicated at block 406, demodulating the SC transmission may include demodulating the SC transmission by de-rotating a rotated 256-QAM constellation point of the SC transmission to a 256-QAM constellation point according to a rotation factor, and de-mapping the 256-QAM constellation point to an 8-bit vector. For example, controller 124 (FIG. 1) may control, cause and/or trigger device 102 (FIG. 1) to demodulate the SC transmission by de-rotating the rotated 256-QAM constellation point to the 256-QAM constellation point according to the rotation factor, and de-mapping the 256-QAM constellation point to the 8-bit vector, e.g., as described above.

Figure 5:
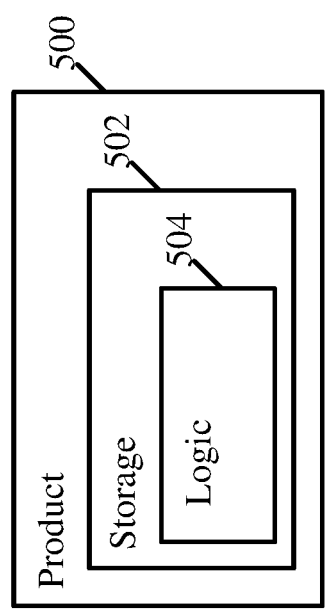
FIG. 5 is a schematic illustration of a product of manufacture, in accordance with some demonstrative embodiments.

Reference is made to FIG. 5, which schematically illustrates a product of manufacture 500, in accordance with some demonstrative embodiments. Product 500 may include one or more tangible computer-readable non-transitory storage media 502, which may include computer-executable instructions, e.g., implemented by logic 504, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to perform one or more operations, and/or to perform, trigger and/or implement one or more operations, communications and/or functionalities described above with reference to FIGS. 1, 2, 3, and/or 4, and/or one or more operations described herein. The phrase "non-transitory machine-readable medium" is directed to include all computer-readable media, with the sole exception being a transitory propagating signal.

In some demonstrative embodiments, product 500 and/or storage media 1002 may include one or more types of computer-readable storage media capable of storing data, including volatile memory, non-volatile memory, removable or non-removable memory, erasable or non-erasable memory, writeable or re-writeable memory, and the like. For example, machine-readable storage media 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, firmware, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to modulate a Single Carrier (SC) transmission according to a rotated 256 Quadrature Amplitude Modulation (256-QAM) scheme; and transmit the SC transmission over a millimeter Wave (mmWave) frequency band.

Example 2 includes the subject matter of Example 1, and optionally, wherein the rotated 256-QAM scheme comprises a $\pi/2$-rotated 256-QAM scheme.

Example 3 includes the subject matter of Example 1 or 2, and optionally, wherein the apparatus is configured to cause the wireless station to modulate the SC transmission by mapping an 8-bit vector to a 256-QAM constellation point and rotating the 256-QAM constellation point by a rotation factor.

Example 4 includes the subject matter of Example 3, and optionally, wherein the rotation factor is based on $\pi/2$.

Example 5 includes the subject matter of Example 4, and optionally, wherein the rotation factor is based on an integer multiple of $\pi/2$.

Example 6 includes the subject matter of any one of Examples 3-5, and optionally, wherein the rotation factor is based on a time index value corresponding to the 8-bit vector.

Example 7 includes the subject matter of Example 6, and optionally, wherein the rotation factor is based on a product of the time index value and $\pi/2$.

Example 8 includes the subject matter of Example 6 or 7, and optionally, wherein the time index value comprises a time SC chip index corresponding to the 8-bit vector.

Example 9 includes the subject matter of any one of Examples 3-8, and optionally, wherein the apparatus is configured to cause the wireless station to modulate the SC transmission by rotating the 256-QAM constellation point in time.

Example 10 includes the subject matter of any one of Examples 1-9, and optionally, wherein the wireless station comprises a Directional Multi-Gigabit (DMG) Station (STA).

Example 11 includes the subject matter of any one of Examples 1-10, and optionally, comprising a radio to transmit the SC transmission.

Example 12 includes the subject matter of any one of Examples 1-11, and optionally, comprising one or more antennas, a memory, and a processor.

Example 13 includes a system of wireless communication comprising a wireless station, the wireless station comprising one or more antennas; a radio; a memory; a processor; and a controller configured to cause the wireless station to modulate a Single Carrier (SC) transmission according to a rotated 256 Quadrature Amplitude Modulation (256-QAM) scheme; and transmit the SC transmission over a millimeter Wave (mmWave) frequency band.

Example 14 includes the subject matter of Example 13, and optionally, wherein the rotated 256-QAM scheme comprises a $\pi/2$-rotated 256-QAM scheme.

Example 15 includes the subject matter of Example 13 or 14, and optionally, wherein the controller is configured to cause the wireless station to modulate the SC transmission by mapping an 8-bit vector to a 256-QAM constellation point and rotating the 256-QAM constellation point by a rotation factor.

Example 16 includes the subject matter of Example 15, and optionally, wherein the rotation factor is based on $\pi/2$.

Example 17 includes the subject matter of Example 16, and optionally, wherein the rotation factor is based on an integer multiple of $\pi/2$.

Example 18 includes the subject matter of any one of Examples 15-17, and optionally, wherein the rotation factor is based on a time index value corresponding to the 8-bit vector.

Example 19 includes the subject matter of Example 18, and optionally, wherein the rotation factor is based on a product of the time index value and $\pi/2$.

Example 20 includes the subject matter of Example 18 or 19, and optionally, wherein the time index value comprises a time SC chip index corresponding to the 8-bit vector.

Example 21 includes the subject matter of any one of Examples 15-20, and optionally, wherein the controller is configured to cause the wireless station to modulate the SC transmission by rotating the 256-QAM constellation point in time.

Example 22 includes the subject matter of any one of Examples 13-21, and optionally, wherein the wireless station comprises a Directional Multi-Gigabit (DMG) Station (STA).

Example 23 includes the subject matter of any one of Examples 13-22, and optionally, wherein the radio is to transmit the SC transmission.

Example 24 includes a method to be performed at a wireless station, the method comprising modulating a Single Carrier (SC) transmission according to a rotated 256 Quadrature Amplitude Modulation (256-QAM) scheme; and transmitting the SC transmission over a millimeter Wave (mmWave) frequency band.

Example 25 includes the subject matter of Example 24, and optionally, wherein the rotated 256-QAM scheme comprises a π/2-rotated 256-QAM scheme.

Example 26 includes the subject matter of Example 24 or 25, and optionally, comprising modulating the SC transmission by mapping an 8-bit vector to a 256-QAM constellation point and rotating the 256-QAM constellation point by a rotation factor.

Example 27 includes the subject matter of Example 26, and optionally, wherein the rotation factor is based on π/2.

Example 28 includes the subject matter of Example 27, and optionally, wherein the rotation factor is based on an integer multiple of π/2.

Example 29 includes the subject matter of any one of Examples 26-28, and optionally, wherein the rotation factor is based on a time index value corresponding to the 8-bit vector.

Example 30 includes the subject matter of Example 29, and optionally, wherein the rotation factor is based on a product of the time index value and π/2.

Example 31 includes the subject matter of Example 29 or 30, and optionally, wherein the time index value comprises a time SC chip index corresponding to the 8-bit vector.

Example 32 includes the subject matter of any one of Examples 26-31, and optionally, comprising modulating the SC transmission by rotating the 256-QAM constellation point in time.

Example 33 includes the subject matter of any one of Examples 24-32, and optionally, wherein the wireless station comprises a Directional Multi-Gigabit (DMG) Station (STA).

Example 34 includes a product comprising one or more tangible computer-readable non-transitory storage media comprising computer-executable instructions operable to, when executed by at least one computer processor, enable the at least one computer processor to cause a wireless station to modulate a Single Carrier (SC) transmission according to a rotated 256 Quadrature Amplitude Modulation (256-QAM) scheme; and transmit the SC transmission over a millimeter Wave (mmWave) frequency band.

Example 35 includes the subject matter of Example 34, and optionally, wherein the rotated 256-QAM scheme comprises a π/2-rotated 256-QAM scheme.

Example 36 includes the subject matter of Example 34 or 35, and optionally, wherein the instructions, when executed, cause the wireless station to modulate the SC transmission by mapping an 8-bit vector to a 256-QAM constellation point and rotating the 256-QAM constellation point by a rotation factor.

Example 37 includes the subject matter of Example 36, and optionally, wherein the rotation factor is based on π/2.

Example 38 includes the subject matter of Example 37, and optionally, wherein the rotation factor is based on an integer multiple of π/2.

Example 39 includes the subject matter of any one of Examples 36-38, and optionally, wherein the rotation factor is based on a time index value corresponding to the 8-bit vector.

Example 40 includes the subject matter of Example 39, and optionally, wherein the rotation factor is based on a product of the time index value and π/2.

Example 41 includes the subject matter of Example 39 or 40, and optionally, wherein the time index value comprises a time SC chip index corresponding to the 8-bit vector.

Example 42 includes the subject matter of any one of Examples 36-41, and optionally, wherein the instructions, when executed, cause the wireless station to modulate the SC transmission by rotating the 256-QAM constellation point in time.

Example 43 includes the subject matter of any one of Examples 34-42, and optionally, wherein the wireless station comprises a Directional Multi-Gigabit (DMG) Station (STA).

Example 44 includes an apparatus of wireless communication by a wireless station, the apparatus comprising means for modulating a Single Carrier (SC) transmission according to a rotated 256 Quadrature Amplitude Modulation (256-QAM) scheme; and means for transmitting the SC transmission over a millimeter Wave (mmWave) frequency band.

Example 45 includes the subject matter of Example 44, and optionally, wherein the rotated 256-QAM scheme comprises a π/2-rotated 256-QAM scheme.

Example 46 includes the subject matter of Example 44 or 45, and optionally, comprising means for modulating the SC transmission by mapping an 8-bit vector to a 256-QAM constellation point and rotating the 256-QAM constellation point by a rotation factor.

Example 47 includes the subject matter of Example 46, and optionally, wherein the rotation factor is based on π/2.

Example 48 includes the subject matter of Example 47, and optionally, wherein the rotation factor is based on an integer multiple of π/2.

Example 49 includes the subject matter of any one of Examples 46-48, and optionally, wherein the rotation factor is based on a time index value corresponding to the 8-bit vector.

Example 50 includes the subject matter of Example 49, and optionally, wherein the rotation factor is based on a product of the time index value and π/2.

Example 51 includes the subject matter of Example 49 or 50, and optionally, wherein the time index value comprises a time SC chip index corresponding to the 8-bit vector.

Example 52 includes the subject matter of any one of Examples 46-51, and optionally, comprising means for modulating the SC transmission by rotating the 256-QAM constellation point in time.

Example 53 includes the subject matter of any one of Examples 44-52, and optionally, wherein the wireless station comprises a Directional Multi-Gigabit (DMG) Station (STA).

Example 54 includes an apparatus comprising logic and circuitry configured to cause a wireless station to receive a Single Carrier (SC) transmission over a millimeter Wave (mmWave) frequency band; and demodulate the SC transmission according to a rotated 256 Quadrature Amplitude Modulation (256-QAM) scheme.

Example 55 includes the subject matter of Example 54, and optionally, wherein the rotated 256-QAM scheme comprises a π/2-rotated 256-QAM scheme.

Example 56 includes the subject matter of Example 54 or 55, and optionally, wherein the apparatus is configured to cause the wireless station to demodulate the SC transmission by de-rotating a rotated 256-QAM constellation point to a 256-QAM constellation point according to a rotation factor, and demapping the 256-QAM constellation point to an 8-bit vector.

Example 57 includes the subject matter of Example 56, and optionally, wherein the rotation factor is based on π/2.

Example 58 includes the subject matter of Example 57, and optionally, wherein the rotation factor is based on an integer multiple of $\pi/2$.

Example 59 includes the subject matter of any one of Examples 56-58, and optionally, wherein the rotation factor is based on a time index value corresponding to the 8-bit vector.

Example 60 includes the subject matter of Example 59, and optionally, wherein the rotation factor is based on a product of the time index value and $\pi/2$.

Example 61 includes the subject matter of Example 59 or 60, and optionally, wherein the time index value comprises a time SC chip index corresponding to the 8-bit vector.

Example 62 includes the subject matter of any one of Examples 56-61, and optionally, wherein the apparatus is configured to cause the wireless station to demodulate the SC transmission by de-rotating the 256-QAM constellation point in time.

Example 63 includes the subject matter of any one of Examples 54-62, and optionally, wherein the wireless station comprises a Directional Multi-Gigabit (DMG) Station (STA).

Example 64 includes the subject matter of any one of Examples 54-63, and optionally, comprising a radio to receive the SC transmission.

Example 65 includes the subject matter of any one of Examples 54-64, and optionally, comprising one or more antennas, a memory, and a processor.

Example 66 includes a system of wireless communication comprising a wireless station, the wireless station comprising one or more antennas; a radio; a memory; a processor; and a controller configured to cause the wireless station to receive a Single Carrier (SC) transmission over a millimeter Wave (mmWave) frequency band; and demodulate the SC transmission according to a rotated 256 Quadrature Amplitude Modulation (256-QAM) scheme.

Example 67 includes the subject matter of Example 66, and optionally, wherein the rotated 256-QAM scheme comprises a $\pi/2$-rotated 256-QAM scheme.

Example 68 includes the subject matter of Example 66 or 67, and optionally, wherein the controller is configured to cause the wireless station to demodulate the SC transmission by de-rotating a rotated 256-QAM constellation point to a 256-QAM constellation point according to a rotation factor, and demapping the 256-QAM constellation point to an 8-bit vector.

Example 69 includes the subject matter of Example 68, and optionally, wherein the rotation factor is based on $\pi/2$.

Example 70 includes the subject matter of Example 69, and optionally, wherein the rotation factor is based on an integer multiple of $\pi/2$.

Example 71 includes the subject matter of any one of Examples 68-70, and optionally, wherein the rotation factor is based on a time index value corresponding to the 8-bit vector.

Example 72 includes the subject matter of Example 71, and optionally, wherein the rotation factor is based on a product of the time index value and $\pi/2$.

Example 73 includes the subject matter of Example 71 or 72, and optionally, wherein the time index value comprises a time SC chip index corresponding to the 8-bit vector.

Example 74 includes the subject matter of any one of Examples 68-73, and optionally, wherein the controller is configured to cause the wireless station to demodulate the SC transmission by de-rotating the 256-QAM constellation point in time.

Example 75 includes the subject matter of any one of Examples 66-74, and optionally, wherein the wireless station comprises a Directional Multi-Gigabit (DMG) Station (STA).

Example 76 includes the subject matter of any one of Examples 66-75, and optionally, wherein the radio is to receive the SC transmission.

Example 77 includes a method to be performed at a wireless station, the method comprising receiving a Single Carrier (SC) transmission over a millimeter Wave (mmWave) frequency band; and demodulating the SC transmission according to a rotated 256 Quadrature Amplitude Modulation (256-QAM) scheme.

Example 78 includes the subject matter of Example 77, and optionally, wherein the rotated 256-QAM scheme comprises a $\pi/2$-rotated 256-QAM scheme.

Example 79 includes the subject matter of Example 77 or 78, and optionally, comprising demodulating the SC transmission by de-rotating a rotated 256-QAM constellation point to a 256-QAM constellation point according to a rotation factor, and demapping the 256-QAM constellation point to an 8-bit vector.

Example 80 includes the subject matter of Example 79, and optionally, wherein the rotation factor is based on $\pi/2$.

Example 81 includes the subject matter of Example 80, and optionally, wherein the rotation factor is based on an integer multiple of $\pi/2$.

Example 82 includes the subject matter of any one of Examples 79-81, and optionally, wherein the rotation factor is based on a time index value corresponding to the 8-bit vector.

Example 83 includes the subject matter of Example 82, and optionally, wherein the rotation factor is based on a product of the time index value and $\pi/2$.

Example 84 includes the subject matter of Example 82 or 83, and optionally, wherein the time index value comprises a time SC chip index corresponding to the 8-bit vector.

Example 85 includes the subject matter of any one of Examples 79-84, and optionally, comprising demodulating the SC transmission by de-rotating the 256-QAM constellation point in time.

Example 86 includes the subject matter of any one of Examples 77-85, and optionally, wherein the wireless station comprises a Directional Multi-Gigabit (DMG) Station (STA).

Example 87 includes a product comprising one or more tangible computer-readable non-transitory storage media comprising computer-executable instructions operable to, when executed by at least one computer processor, enable the at least one computer processor to cause a wireless station to receive a Single Carrier (SC) transmission over a millimeter Wave (mmWave) frequency band; and demodulate the SC transmission according to a rotated 256 Quadrature Amplitude Modulation (256-QAM) scheme.

Example 88 includes the subject matter of Example 87, and optionally, wherein the rotated 256-QAM scheme comprises a $\pi/2$-rotated 256-QAM scheme.

Example 89 includes the subject matter of Example 87 or 88, and optionally, wherein the instructions, when executed, cause the wireless station to demodulate the SC transmission by de-rotating a rotated 256-QAM constellation point to a 256-QAM constellation point according to a rotation factor, and demapping the 256-QAM constellation point to an 8-bit vector.

Example 90 includes the subject matter of Example 89, and optionally, wherein the rotation factor is based on $\pi/2$.

Example 91 includes the subject matter of Example 90, and optionally, wherein the rotation factor is based on an integer multiple of π/2.

Example 92 includes the subject matter of any one of Examples 89-91, and optionally, wherein the rotation factor is based on a time index value corresponding to the 8-bit vector.

Example 93 includes the subject matter of Example 92, and optionally, wherein the rotation factor is based on a product of the time index value and π/2.

Example 94 includes the subject matter of Example 92 or 93, and optionally, wherein the time index value comprises a time SC chip index corresponding to the 8-bit vector.

Example 95 includes the subject matter of any one of Examples 89-94, and optionally, wherein the instructions, when executed, cause the wireless station to demodulate the SC transmission by de-rotating the 256-QAM constellation point in time.

Example 96 includes the subject matter of any one of Examples 87-95, and optionally, wherein the wireless station comprises a Directional Multi-Gigabit (DMG) Station (STA).

Example 97 includes an apparatus of wireless communication by a wireless station, the apparatus comprising means for receiving a Single Carrier (SC) transmission over a millimeter Wave (mmWave) frequency band; and means for demodulating the SC transmission according to a rotated 256 Quadrature Amplitude Modulation (256-QAM) scheme.

Example 98 includes the subject matter of Example 97, and optionally, wherein the rotated 256-QAM scheme comprises a π/2-rotated 256-QAM scheme.

Example 99 includes the subject matter of Example 97 or 98, and optionally, comprising means for demodulating the SC transmission by de-rotating a rotated 256-QAM constellation point to a 256-QAM constellation point according to a rotation factor, and demapping the 256-QAM constellation point to an 8-bit vector.

Example 100 includes the subject matter of Example 99, and optionally, wherein the rotation factor is based on π/2.

Example 101 includes the subject matter of Example 100, and optionally, wherein the rotation factor is based on an integer multiple of π/2.

Example 102 includes the subject matter of any one of Examples 99-101, and optionally, wherein the rotation factor is based on a time index value corresponding to the 8-bit vector.

Example 103 includes the subject matter of Example 102, and optionally, wherein the rotation factor is based on a product of the time index value and π/2.

Example 104 includes the subject matter of Example 102 or 103, and optionally, wherein the time index value comprises a time SC chip index corresponding to the 8-bit vector.

Example 105 includes the subject matter of any one of Examples 99-104, and optionally, comprising means for demodulating the SC transmission by de-rotating the 256-QAM constellation point in time.

Example 106 includes the subject matter of any one of Examples 97-105, and optionally, wherein the wireless station comprises a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station to:

modulate a Single Carrier (SC) transmission according to a π/2-rotated 256 Quadrature Amplitude Modulation (256-QAM) scheme configured for a SC physical layer (PHY) to support at least one of channel bonding or Multiple-input-Multiple-Output (MIMO) communication over a millimeter Wave (mmWave) frequency band, modulating the SC transmission comprising:

mapping an 8-bit vector, denoted $C_k$, having an index value k, to a corresponding 256-QAM constellation point, denoted $\tilde{S}_k$, as follows:

$$\tilde{S}_k = \frac{1}{\sqrt{170}}$$

$$\left( \begin{array}{c} 30c_{8k} + 14c_{8k+1} + 6c_{8k+2} + 2c_{8k+3} - 28c_{8k}c_{8k+1} - \\ 12c_{8k}c_{8k+2} - 4c_{8k}c_{8k+3} - 12c_{8k+1}c_{8k+2} - 4c_{8k+1}c_{8k+3} - \\ 4c_{8k+2}c_{8k+3} + 24c_{8k}c_{8k+1}c_{8k+2} + 8c_{8k}c_{8k+1}c_{8k+3} + + \\ 8c_{8k}c_{8k+2}c_{8k+3} + 8c_{8k+1}c_{8k+2}c_{8k+3} - 16c_{8k}c_{8k+1}c_{8k+2}c_{8k+3} - 15 \end{array} \right) +$$

$$\frac{j}{\sqrt{170}} \left( \begin{array}{c} 30c_{8k+4} + 14c_{8k+5} + 6c_{8k+6} + 2c_{8k+7} - 28c_{8k+4}c_{8k+5} - \\ 12c_{8k+4}c_{8k+6} - 4c_{8k+4}c_{8k+7} - 12c_{8k+5}c_{8k+6} - \\ 4c_{8k+5}c_{8k+7} - 4c_{8k+6}c_{8k+7} + 24c_{8k+4}c_{8k+5}c_{8k+6} + \\ 8c_{8k+4}c_{8k+5}c_{8k+7} + + 8c_{8k+4}c_{8k+6}c_{8k+7} + 8c_{8k+5}c_{8k+6}c_{8k+7} - \\ 16c_{8k+4}c_{8k+5}c_{8k+6}c_{8k+7} - 15 \end{array} \right)$$

wherein $C_k = \{C_{8k}, C_{8k+1}, C_{8k+2}, C_{8k+3}, C_{8k+4}, C_{8k+5}, C_{8k+6}, C_{8k+7}\}$; and rotating the 256-QAM constellation point $\tilde{S}_k$ by a rotation factor, which is based on a product of π/2 and the index value k; and transmit the SC transmission over the mmWave frequency band.

2. The apparatus of claim 1, wherein the index value k is a time index value corresponding to said 8-bit vector.

3. The apparatus of claim 2, wherein the time index value comprises a time SC chip index corresponding to said 8-bit vector.

4. The apparatus of claim 1 configured to cause the wireless station to modulate the SC transmission by rotating the 256-QAM constellation point in time.

5. The apparatus of claim 1, wherein the wireless station comprises a Directional Multi-Gigabit (DMG) Station (STA).

6. The apparatus of claim 1 comprising a radio to transmit the SC transmission.

7. The apparatus of claim 1 comprising one or more antennas, a memory, and a processor.

8. A product comprising one or more tangible computer-readable non-transitory storage media comprising computer-executable instructions operable to, when executed by at least one processor, enable the at least one processor to cause a wireless station to:

modulate a Single Carrier (SC) transmission according to a π/2-rotated 256 Quadrature Amplitude Modulation (256-QAM) scheme configured for a SC physical layer (PHY) to support at least one of channel bonding or Multiple-input-Multiple-Output (MIMO) communication over a millimeter Wave (mmWave) frequency band, modulating the SC transmission comprising:
mapping an 8-bit vector, denoted $C_k$, having an index value k, to a corresponding 256-QAM constellation point, denoted $\tilde{S}_k$, as follows:

$$\tilde{s}_k = \frac{1}{\sqrt{170}}$$

$$\begin{pmatrix} 30c_{8k} + 14c_{8k+1} + 6c_{8k+2} + 2c_{8k+3} - 28c_{8k}c_{8k+1} - \\ 12c_{8k}c_{8k+2} - 4c_{8k}c_{8k+3} - -12c_{8k+1}c_{8k+2} - 4c_{8k+1}c_{8k+3} - \\ 4c_{8k+2}c_{8k+3} + 24c_{8k}c_{8k+1}c_{8k+2} + 8c_{8k}c_{8k+1}c_{8k+3} ++ \\ 8c_{8k}c_{8k+2}c_{8k+3} + 8c_{8k+1}c_{8k+2}c_{8k+3} - 16c_{8k}c_{8k+1}c_{8k+2}c_{8k+3} - 15 \end{pmatrix} +$$

$$\frac{j}{\sqrt{170}} \begin{pmatrix} 30c_{8k+4} + 14c_{8k+5} + 6c_{8k+6} + 2c_{8k+7} - 28c_{8k+4}c_{8k+5} - \\ 12c_{8k+4}c_{8k+6} - 4c_{8k+4}c_{8k+7} - -12c_{8k+5}c_{8k+6} - \\ 4c_{8k+5}c_{8k+7} - 4c_{8k+6}c_{8k+7} + 24c_{8k+4}c_{8k+5}c_{8k+6} + \\ 8c_{8k+4}c_{8k+5}c_{8k+7} ++ 8c_{8k+4}c_{8k+6}c_{8k+7} + 8c_{8k+5}c_{8k+6}c_{8k+7} - \\ 16c_{8k+4}c_{8k+5}c_{8k+6}c_{8k+7} - 15 \end{pmatrix}$$

wherein $C_k = \{C_{8k}, C_{8k+1}, C_{8k+2}, C_{8k+3}, C_{8k+4}, C_{8k+5}, C_{8k+6}, C_{8k+7}\}$; and
rotating the 256-QAM constellation point $\tilde{S}_k$ by a rotation factor, which is based on a product of $\pi/2$ and the index value k; and
transmit the SC transmission over the mmWave frequency band.

9. The product of claim 8, wherein the instructions, when executed, cause the wireless station to modulate the SC transmission by rotating the 256-QAM constellation point in time.

10. The product of claim 8, wherein the index value k is a time index value corresponding to said 8-bit vector.

11. The product of claim 10, wherein the time index value comprises a time SC chip index corresponding to said 8-bit vector.

12. An apparatus comprising logic and circuitry configured to cause a wireless station to:
receive a Single Carrier (SC) transmission over a millimeter Wave (mmWave) frequency band; and
demodulate the SC transmission according to a $\pi/2$-rotated 256 Quadrature Amplitude Modulation (256-QAM) scheme configured for a SC physical layer (PHY) to support at least one of channel bonding or Multiple-input-Multiple-Output (MIMO) communication over the mmWave frequency band, demodulating the SC transmission comprising:
de-rotating, a rotated 256-QAM constellation point to a 256-QAM constellation point, denoted $\tilde{S}_k$, corresponding to an index value k, according to a rotation factor which is based on a product of $\pi/2$ and the index value k; and
de-mapping the 256-QAM constellation point $\tilde{S}_k$ to an 8-bit vector, denoted $C_k$, according to the following relationship:

$$\tilde{s}_k = \frac{1}{\sqrt{170}}$$

$$\begin{pmatrix} 30c_{8k} + 14c_{8k+1} + 6c_{8k+2} + 2c_{8k+3} - 28c_{8k}c_{8k+1} - \\ 12c_{8k}c_{8k+2} - 4c_{8k}c_{8k+3} - -12c_{8k+1}c_{8k+2} - 4c_{8k+1}c_{8k+3} - \\ 4c_{8k+2}c_{8k+3} + 24c_{8k}c_{8k+1}c_{8k+2} + 8c_{8k}c_{8k+1}c_{8k+3} ++ \\ 8c_{8k}c_{8k+2}c_{8k+3} + 8c_{8k+1}c_{8k+2}c_{8k+3} - 16c_{8k}c_{8k+1}c_{8k+2}c_{8k+3} - 15 \end{pmatrix} +$$

$$\frac{j}{\sqrt{170}} \begin{pmatrix} 30c_{8k+4} + 14c_{8k+5} + 6c_{8k+6} + 2c_{8k+7} - 28c_{8k+4}c_{8k+5} - \\ 12c_{8k+4}c_{8k+6} - 4c_{8k+4}c_{8k+7} - -12c_{8k+5}c_{8k+6} - \\ 4c_{8k+5}c_{8k+7} - 4c_{8k+6}c_{8k+7} + 24c_{8k+4}c_{8k+5}c_{8k+6} + \\ 8c_{8k+4}c_{8k+5}c_{8k+7} ++ 8c_{8k+4}c_{8k+6}c_{8k+7} + 8c_{8k+5}c_{8k+6}c_{8k+7} - \\ 16c_{8k+4}c_{8k+5}c_{8k+6}c_{8k+7} - 15 \end{pmatrix}$$

wherein $C_k = \{C_{8k}, C_{8k+1}, C_{8k+2}, C_{8k+3}, C_{8k+4}, C_{8k+5}, C_{8k+6}, C_{8k+7}\}$.

13. The apparatus of claim 12 comprising a radio to receive the SC transmission.

14. The apparatus of claim 12, wherein the index value k is a time index value corresponding to said 8-bit vector.

15. The apparatus of claim 12 configured to cause the wireless station to demodulate the SC transmission by de-rotating the rotated 256-QAM constellation point in time.

16. The apparatus of claim 12 comprising one or more antennas, a memory, and a processor.

17. A product comprising one or more tangible computer-readable non-transitory storage media comprising computer-executable instructions operable to, when executed by at least one processor, enable the at least one processor to cause a wireless station to:
receive a Single Carrier (SC) transmission over a millimeter Wave (mmWave) frequency band; and
demodulate the SC transmission according to a $\pi/2$-rotated 256 Quadrature Amplitude Modulation (256-QAM) scheme configured for a SC physical layer (PHY) to support at least one of channel bonding or Multiple-Input-Multiple-Output (MIMO) communication over the mmWave frequency band, demodulating the SC transmission comprising:
de-rotating a rotated 256-QAM constellation point, to a 256-QAM constellation point, denoted $\tilde{S}_k$, corresponding to an index value k, according to a rotation factor which is based on a product of $\pi/2$ and the index value k; and
de-mapping the 256-QAM constellation point $\tilde{S}_k$ to an 8-bit vector, denoted $C_k$, according to the following relationship:

$$\tilde{s}_k = \frac{1}{\sqrt{170}}$$

$$\begin{pmatrix} 30c_{8k} + 14c_{8k+1} + 6c_{8k+2} + 2c_{8k+3} - 28c_{8k}c_{8k+1} - \\ 12c_{8k}c_{8k+2} - 4c_{8k}c_{8k+3} - -12c_{8k+1}c_{8k+2} - 4c_{8k+1}c_{8k+3} - \\ 4c_{8k+2}c_{8k+3} + 24c_{8k}c_{8k+1}c_{8k+2} + 8c_{8k}c_{8k+1}c_{8k+3} ++ \\ 8c_{8k}c_{8k+2}c_{8k+3} + 8c_{8k+1}c_{8k+2}c_{8k+3} - 16c_{8k}c_{8k+1}c_{8k+2}c_{8k+3} - 15 \end{pmatrix} +$$

$$\frac{j}{\sqrt{170}} \begin{pmatrix} 30c_{8k+4} + 14c_{8k+5} + 6c_{8k+6} + 2c_{8k+7} - 28c_{8k+4}c_{8k+5} - \\ 12c_{8k+4}c_{8k+6} - 4c_{8k+4}c_{8k+7} - -12c_{8k+5}c_{8k+6} - \\ 4c_{8k+5}c_{8k+7} - 4c_{8k+6}c_{8k+7} + 24c_{8k+4}c_{8k+5}c_{8k+6} + \\ 8c_{8k+4}c_{8k+5}c_{8k+7} ++ 8c_{8k+4}c_{8k+6}c_{8k+7} + 8c_{8k+5}c_{8k+6}c_{8k+7} - \\ 16c_{8k+4}c_{8k+5}c_{8k+6}c_{8k+7} - 15 \end{pmatrix}$$

wherein $C_k = \{C_{8k}, C_{8k+1}, C_{8k+2}, C_{8k+3}, C_{8k+4}, C_{8k+5}, C_{8k+6}, C_{8k+7}\}$.

18. The product of claim 17, wherein the index value k is a time index value corresponding to said 8-bit vector $C_k$.

19. The product of claim 18, wherein the time index value comprises a time SC chip index corresponding to said 8-bit vector.

20. The product of claim 17, wherein the instructions, when executed, cause the wireless station to demodulate the SC transmission by de-rotating the rotated 256-QAM constellation point in time.

* * * * *